United States Patent
Hirose

(10) Patent No.: US 8,908,614 B2
(45) Date of Patent: Dec. 9, 2014

(54) MANAGEMENT APPARATUS, CONTROL METHOD, AND PROGRAM

(75) Inventor: Takatoshi Hirose, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 703 days.

(21) Appl. No.: 12/744,370

(22) PCT Filed: Feb. 5, 2009

(86) PCT No.: PCT/JP2009/052357
§ 371 (c)(1),
(2), (4) Date: May 24, 2010

(87) PCT Pub. No.: WO2009/107490
PCT Pub. Date: Sep. 3, 2009

(65) Prior Publication Data
US 2010/0246522 A1    Sep. 30, 2010

(30) Foreign Application Priority Data

Feb. 26, 2008    (JP) ................. 2008-045106

(51) Int. Cl.
*H04W 4/00*    (2009.01)
*H04W 84/20*    (2009.01)
*H04W 8/22*    (2009.01)
*H04W 8/00*    (2009.01)

(52) U.S. Cl.
CPC ........... *H04W 84/20* (2013.01); *H04W 8/22* (2013.01); *H04W 8/005* (2013.01)
USPC ........................................... 370/329

(58) Field of Classification Search
USPC ......................... 370/328, 329, 331
See application file for complete search history.

(56) References Cited

U.S. PATENT DOCUMENTS

| | | | | |
|---|---|---|---|---|
| 5,159,702 | A | * | 10/1992 | Aratake ................... 455/464 |
| 5,263,025 | A | * | 11/1993 | Torii et al. ................ 370/468 |
| 6,571,108 | B1 | * | 5/2003 | Otsuka et al. ........... 455/433 |
| 7,496,383 | B2 | * | 2/2009 | Kurata et al. ........... 455/561 |

(Continued)

FOREIGN PATENT DOCUMENTS

| | | |
|---|---|---|
| JP | 6-178348 A | 6/1994 |
| JP | 2003-143644 A | 5/2003 |

(Continued)

OTHER PUBLICATIONS

Mar. 17, 2009 International Search Report and Written Opinion in PCT/JP2009/052357.

(Continued)

*Primary Examiner* — Mohammad Anwar
(74) *Attorney, Agent, or Firm* — Fitzpatrick, Cella, Harper & Scinto

(57) ABSTRACT

The invention makes it possible to manage, even if some of wireless terminals leave a wireless communication network to be managed, the wireless terminals which have left. The invention provides a management apparatus which is connected to an AP and manages each wireless terminal communicating with the AP by using a management table, including a unit for determining based on the management table, when a wireless terminal leaves the first wireless communication network to newly form the second wireless communication network, the SSID of the second wireless communication network, a unit for updating the management table with the determined SSID, and a unit for transmitting the determined SSID to the wireless terminal which is to form the second wireless communication network.

24 Claims, 11 Drawing Sheets

(56) References Cited

U.S. PATENT DOCUMENTS

| | | | |
|---|---|---|---|
| 8,050,232 B2 * | 11/2011 | Sachs et al. | 370/331 |
| 8,275,758 B2 * | 9/2012 | Tanabe et al. | 707/706 |
| 8,611,840 B2 * | 12/2013 | Kitani et al. | 455/226.2 |
| 2003/0169697 A1 | 9/2003 | Suzuki et al. | |
| 2004/0047324 A1 | 3/2004 | Diener | |
| 2007/0047480 A1 | 3/2007 | Suga | |

FOREIGN PATENT DOCUMENTS

| | | |
|---|---|---|
| JP | 2005-303700 A | 10/2005 |
| JP | 2007-028232 A | 2/2007 |
| JP | 2007-67745 A | 3/2007 |
| JP | 2007-150509 A | 6/2007 |
| WO | 2005/034434 A1 | 4/2005 |
| WO | 2006/099588 A2 | 9/2006 |

OTHER PUBLICATIONS

Dec. 28, 2009 International Preliminary Report on Patentability in PCT/JP2009/052357.

* cited by examiner

F I G. 1
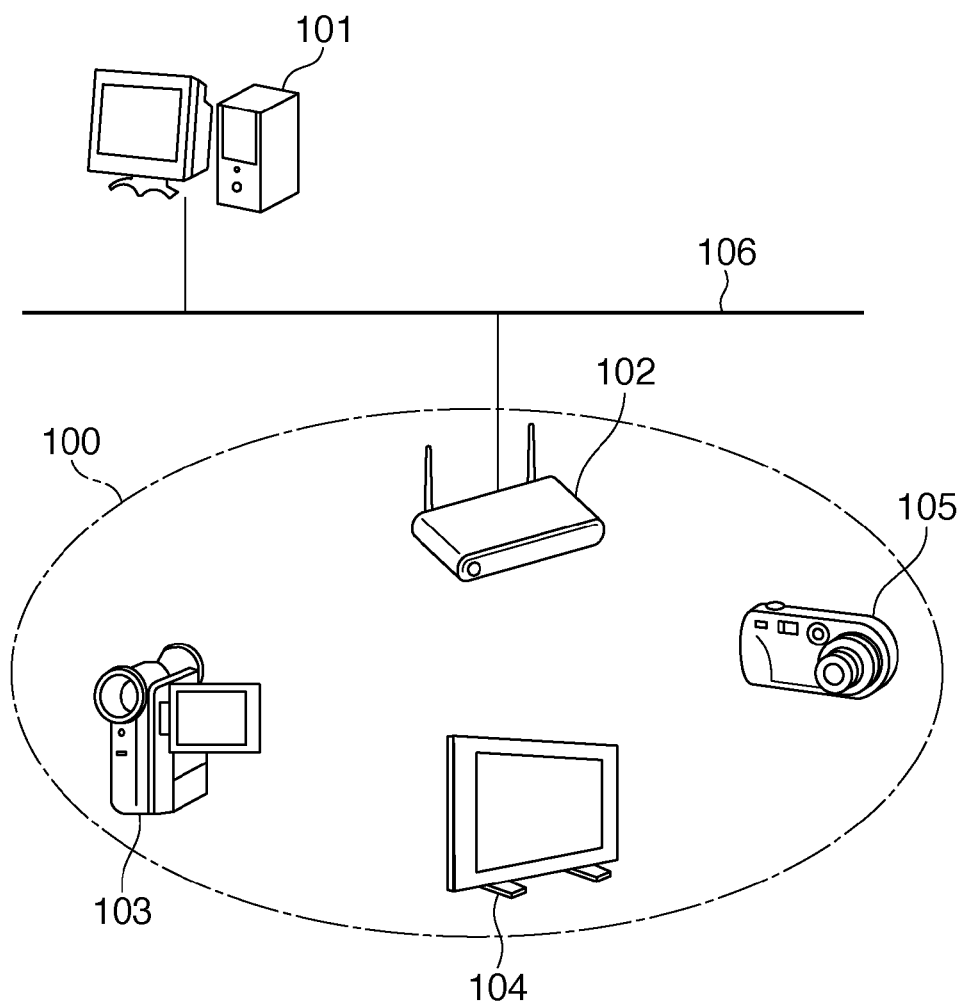

FIG. 3

| MAC ADDRESS | SSID | USE CHANNEL | USE BAND | PRESENCE / ABSENCE OF FORMATION OF SECOND WIRELESS COMMUNICATION NETWORK | DEVICE INFORMATION | INFORMATION ON SERVICE |
|---|---|---|---|---|---|---|
| 00:11:22:33:44:55 | abcde | 6 | – | × | AP | – |
| 00:22:11:33:44:66 | abcde | 6 | – | × | DSC | input |
| 01:23:45:67:89:01 | abcde | 6 | – | × | Display (STA) | output |
| 67:89:01:01:23:45 | abcde | 6 | – | × | DVC | input |
| | | | | | | |

FIG. 6

| MAC ADDRESS | SSID | USE CHANNEL | USE BAND | PRESENCE / ABSENCE OF FORMATION OF SECOND WIRELESS COMMUNICATION NETWORK | DEVICE INFORMATION | INFORMATION ON SERVICE |
|---|---|---|---|---|---|---|
| 00:11:22:33:44:55 | abcde | 6 | - | × | AP | - |
| 00:22:11:33:44:66 | abcde | 6 | - | × | DSC | input |
| 01:23:45:67:89:01 | DL 1 | 11 | 10 | ○ | Display (AP) | output |
| 67:89:01:01:23:45 | DL 1 | 11 | 10 | ○ | DVC | input |
| | | | | | | |
| | | | | | | |

FIG. 8

| MAC ADDRESS | SSID | USE CHANNEL | USE BAND | PRESENCE / ABSENCE OF FORMATION OF SECOND WIRELESS COMMUNICATION NETWORK | DEVICE INFORMATION | INFORMATION ON SERVICE |
|---|---|---|---|---|---|---|
| 00:11:22:33:44:55 | abcde | 6 | - | × | AP | - |
| 00:22:11:33:44:66 | abcde | 6 | - | × | DSC | input |
| 67:89:01:01:23:45 | DL 1 | 11 | - | ○ | DVC | input |
| | | | | | | |
| | | | | | | |
| | | | | | | |

FIG. 11

| MAC ADDRESS | SSID | USE CHANNEL | USE BAND | PRESENCE / ABSENCE OF FORMATION OF SECOND WIRELESS COMMUNICATION NETWORK | DEVICE INFORMATION | INFORMATION ON SERVICE |
|---|---|---|---|---|---|---|
| 00:11:22:33:44:55 | abcde | 6 | - | × | AP | - |
| 00:22:11:33:44:66 | abcde | 6 | - | × | DSC | input |
| 01:23:45:67:89:01 | DL 1 | 11 | 15 | ○ | Display (AP) | output |
| 67:89:01:01:23:45 | DL 1 | 11 | 15 | ○ | DVC | input |
| | | | | | | |
| | | | | | | |

MANAGEMENT APPARATUS, CONTROL METHOD, AND PROGRAM

TECHNICAL FIELD

The present invention relates to a control technique for a management apparatus which manages wireless terminals forming a wireless communication network.

BACKGROUND ART

In recent years, as a communication medium, wireless LANs (Local Area Networks) which do not require any cable have prevailed as an addition to conventional wired LANs.

The wireless LAN limits the range within which services can be provided to the wireless communication area of a wireless base station. To provide services in a wide area, therefore, a plurality of wireless base stations are necessary.

In this case, assume that each wireless base station individually sets network information, and provides services. In this case, frequencies used by the wireless base stations may be centered on a specific frequency, or wireless base stations connected with wireless terminals may be centered on a specific wireless base station. This degrades the communication quality of a plurality of wireless communication networks as a whole.

To avoid such situation in advance, and implement high-quality wireless communication in each wireless communication network, various proposals have been made.

Japanese Patent Laid-Open No. 2007-67745, for example, has proposed the following configuration. That is, a management apparatus for managing wireless terminals and wireless base stations is provided. The management apparatus is notified which wireless base station can be connected with wireless terminals. The management apparatus which has received the notification specifies a wireless base station on the basis of the information.

Furthermore, Japanese Patent Laid-Open No. 6-178348 has proposed a configuration in which not only the information on the same wireless communication network but also that on another wireless communication network are managed. More specifically, the following configuration has been proposed. That is, it is determined in advance which wireless mobile device is to be an information providing device, and if a base station in another network requests information, the information providing device transmits the information via the wired-connected wireless base station.

The configurations disclosed in the above patent references, however, do not consider a case in which some of a plurality of wireless terminals forming a predetermined wireless communication network leave the wireless communication network, and form another wireless communication network.

Japanese Patent Laid-Open No. 2007-67745, for example, is based on the premise that a management apparatus manages information on wireless terminals forming the same wireless communication network. It does not disclose a configuration in which the management apparatus manages information on wireless terminals forming another wireless communication network.

Japanese Patent Laid-Open No. 6-178348 is based on the premise that two wireless communication networks are wired, and has only disclosed a case in which information on the other wireless communication network is managed. This technique, therefore, is not directly applicable to the case in which some of the wireless terminals leave to form a new wireless communication network as described above.

On the other hand, if some of the wireless terminals leave as described above, it is desirable to be able to manage information on the wireless terminals which have left, in order to maintain the communication quality of a plurality of wireless communication networks as a whole.

DISCLOSURE OF INVENTION

The present invention has been made in consideration of the above problems, and has as its object to be able to manage, even if some wireless terminals leave a wireless communication network to be managed, information regarding the wireless terminals. Other objects and features of the present invention will become apparent from the following specification and accompanying drawings.

In order to achieve the above object, a management apparatus according to the present invention has the following configuration. That is, a management apparatus connected to a base station, comprising:

management means for managing, in correspondence with each other, attribute information of a wireless terminal which belongs to a first wireless communication network formed by the base station and network information for communication in a wireless communication network to which the wireless terminal belongs; and update means for updating and managing, when a first wireless terminal which belongs to the first wireless communication network newly forms, as a base station, a second wireless communication network, information pertaining to the first wireless terminal managed by the management means.

According to the present invention, it is possible to manage, even if some wireless terminals leave a wireless communication network to be managed, information on the wireless terminals.

Further features of the present invention will become apparent from the following description of exemplary embodiments with reference to the attached drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1 is a view showing an example of the first wireless communication network which includes a management apparatus (information processing apparatus) according to the first embodiment of the present invention;

FIG. 3 is a table showing an example of a management table 210 stored in the management apparatus 101;

FIG. 6 is a table showing a management table after executing processing (FIG. 4) in the first wireless communication network;

FIG. 8 is a table showing an updated management table;

FIG. 11 is a table showing a management table after updating information on use bands.

BEST MODE FOR CARRYING OUT THE INVENTION

Figure 2:
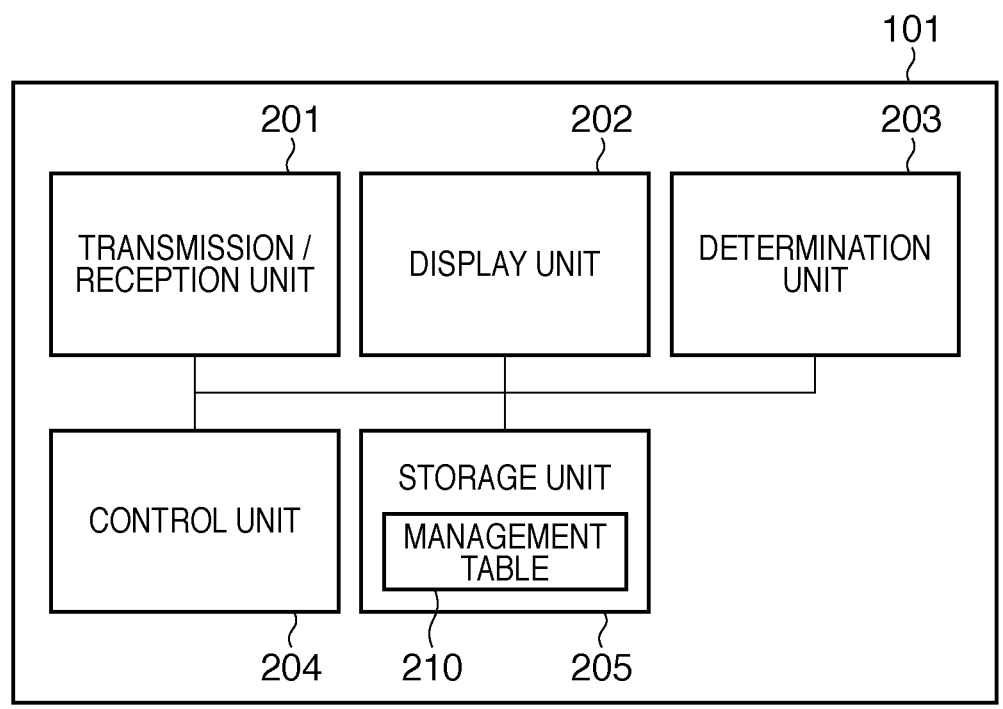
FIG. 2 is a block diagram showing the functional configuration of a management apparatus 101.

Preferred embodiments of the present invention will be described below with reference to the accompanying drawings.

First Embodiment

<1. Configuration of Wireless Communication Network>

FIG. 1 is a view showing a wireless communication network which includes a management apparatus (information processing apparatus) according to the first embodiment of the present invention.

Referring to FIG. 1, reference numeral 101 denotes a management apparatus for managing a wireless communication network 100 (the first wireless communication network); and 102, an access point (AP, a base station) which wirelessly connects to various wireless terminals within a wireless communication area indicated by a dotted line, and transmits, to the management apparatus 101 via a wired LAN 106, various kinds of information transmitted from the wireless terminals. Although the management apparatus 101 and the AP 102 are connected with each other via the wired LAN in FIG. 1, they may be connected via a wireless communication network such as a wireless LAN.

Reference numerals 103 to 105 denote wireless terminals which are wirelessly connected to the AP 102, and form the first wireless communication network 100; 103, a digital video camera; 104, a display device; and 105, a digital still camera.

The display device 104 is a dual terminal capable of switching between a wireless terminal function (DUAL-STA) for operating as a wireless terminal and an access point function (DUAL-AP) for operating as an access point. In this example, assume that the display device 104 operates as a wireless terminal.

<2. Functional Configuration of Management Apparatus>

FIG. 2 is a block diagram showing the functional configuration of the management apparatus 101. Referring to FIG. 2, reference numeral 201 denotes a transmission/reception unit which transmits/receives information to/from the AP 102 via the wired LAN 106.

Reference numeral 202 denotes a display unit which displays information managed by the management apparatus 101; and 203, a determination unit which determines based on the information received by the transmission/reception unit 201 from the AP 102 whether wireless terminals are connectable, which channels are usable in the second wireless communication network to be newly formed, or the like.

Reference numeral 204 denotes a control unit which controls the management apparatus 101 as a whole; and 205, a storage unit which stores a management table 210.

<3. Structure of Management Table>

FIG. 3 is a table showing an example of the management table 210 stored in the management apparatus 101. Pieces of information stored in the management table 210 include network information (reference numerals 301 to 303) and wireless terminal attribute information (reference numerals 306 and 307), and are stored in correspondence with each other.

The network information is information pertaining to communication conditions for wireless terminals forming a wireless communication network to perform communication in the wireless communication network. The network information is acquired from the AP 102 after the first wireless communication network is formed. The wireless terminal attribute information indicates the attributes of each wireless terminal, and is acquired by a predetermined sequence using the UPnP (Universal Plug and Play) technique when each wireless terminal joins the first wireless communication network 100.

Referring to FIG. 3, reference numeral 301 denotes MAC addresses of the AP and the wireless terminals which form the first wireless communication network 100.

Reference numeral 302 denotes an SSID (Service Set IDentifier) as the identification code of the first wireless communication network 100; 303, information on communication channels used by the AP and wireless terminals which form the first wireless communication network 100; and 304, information indicating frequency bands (communication bands) used for communication in the first wireless communication network 100.

Reference numeral 305 denotes information indicating whether a wireless terminal forming the first wireless communication network 100 leaves the first wireless communication network 100, and newly forms the second wireless communication network.

Reference numeral 306 denotes device information of the AP and wireless terminals which form the first wireless communication network 100. In the example of FIG. 3, the device type of each terminal is stored as the device information. Reference numeral 307 denotes information pertaining to services which can be provided by the wireless terminals forming the first wireless communication network 100. In the example of FIG. 3, information indicating whether a wireless terminal is an input device or output device is stored.

<4. Processing Sequence in First Wireless Communication Network>

Figure 4:
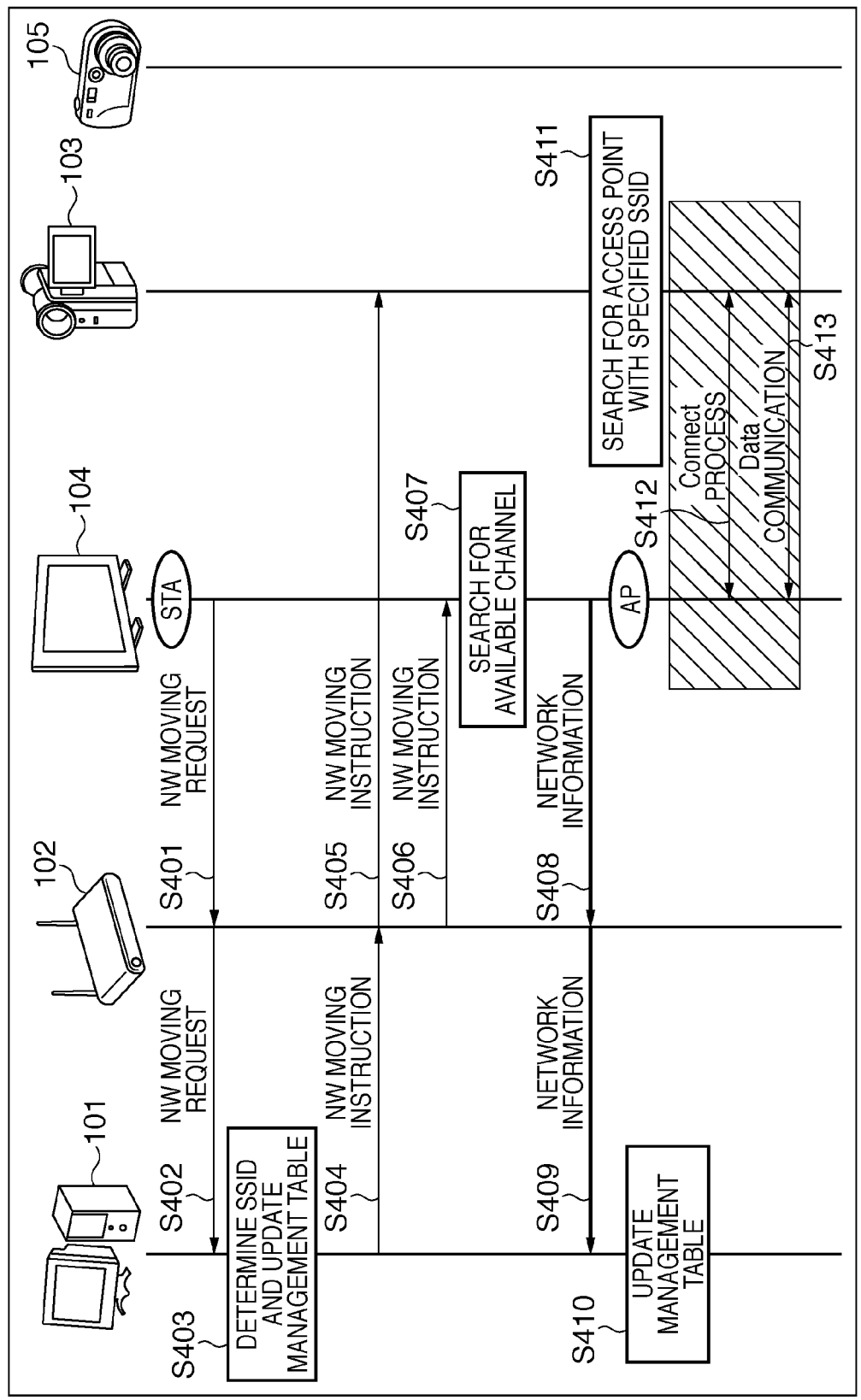
FIG. 4 is a sequence chart showing a processing sequence when a display device 104 and a digital video camera 103, among wireless terminals forming a first wireless communication network 100, leave the first wireless communication network 100.

A processing sequence in the first wireless communication network 100 complying with the IEEE802.11 standard will be described next. FIG. 4 is a sequence chart showing a processing sequence when the display device 104 (the first wireless terminal) and the digital video camera 103 (the second wireless terminal), among the wireless terminals forming the first wireless communication network 100, leave the first wireless communication network 100.

More specifically, FIG. 4 shows a processing sequence when image data recorded in the digital video camera 103 is displayed on the display device 104.

In this case, the user starts an application for displaying the image data on the display device 104.

At this time, processing for bypassing the AP 102 and directly transmitting the image data recorded in the digital video camera 103 to the display device 104 starts. More specifically, the display device 104 functions as an AP, and newly forms a second wireless communication network in which the digital video camera 103 serves as a wireless terminal. This makes it possible to directly transmit the image data from the digital video camera 103 to the display device 104 through the formed second wireless communication network.

In step S401, the display device 104 transmits an inter-network (NW) moving request to the AP 102. Note that the device 104 transmits the inter-network moving request containing information (e.g., an MAC address) on the digital video camera 103 as a communication partner and that on a frequency band desirable for use in the second wireless communication network.

In step S402, the AP 102 which has received the inter-network moving request from the display device 104 transfers it to the management apparatus 101.

In step S403, the management apparatus 101 which has received the inter-network moving request determines the SSID of the second wireless communication network on the basis of the management table 210 stored in the storage unit 205. Note that the SSID is determined so that it is different from the SSID, which is managed in the management table 210, and already used by the first wireless communication network 100. In this embodiment, the new SSID is determined to be "DT1".

The management apparatus 101 rewrites the device information of the display device 104, which is managed as a wireless terminal, to indicate an access point in the management table 210.

In step S404, the management apparatus 101 transmits an inter-network moving instruction containing the determined SSID to the AP 102.

In step S405, the AP 102 which has received the inter-network moving instruction transmits it to the digital video camera 103. In step S406, the AP 102 also transmits the instruction to the display device 104.

The display device 104 which has received the inter-network moving instruction prepares for transition to an access point. More specifically, in step S407, the display device 104 checks the presence/absence of an available channel by probing the wireless communication situation around itself, and determines a channel to be used in the second wireless communication network to be newly formed. Note that in this embodiment, the channel to be used is determined to be "channel 11". The probing may be performed by a method of transmitting a search request signal (probe request), and checking channel information contained in a response (probe response) to the request. Alternatively, the probing may be performed by a method of monitoring a beacon transmitted by the access point for a certain period of time, and checking channel information contained in the received beacon.

In step S408, the display device 104 transmits, to the AP 102, network information containing information on the channel to be used in the second wireless communication network to be newly formed.

After transmitting the network information, the display device 104 which has been operating as a wireless terminal stops the wireless terminal function, and starts an access point function. Note that if the display device 104 has already received the inter-network moving instruction, it may start the access point function before transmitting the network information.

In step S409, the AP 102 which has received the network information transfers it to the management apparatus 101. In step S410, the management apparatus 101 rewrites the use channel of the display device 104 in the management table 210 to "channel 11", and stores information indicating that the second wireless communication network is newly formed (305).

Consequently, the display device 104 which has started the access point function is managed by the management apparatus 101 even after newly forming the second wireless communication network.

Note that the display device 104 which has started the access point function transmits a beacon containing the SSID=DL1 by the use channel=11.

On the other hand, in step S411, the digital video camera 103 which has received the inter-network moving instruction in step S405 searches for an access point with the SSID ("DL1") contained in the inter-network moving instruction. More particularly, the digital video camera 103 transmits a probe request in which "DL1" is set to the SSID, and checks whether it can receive a probe response to the request. Alternatively, the digital video camera 103 transmits a probe request in which the SSID is not specified, and checks an SSID contained in a probe response to the request. Furthermore, the digital video camera 103 may monitor a beacon transmitted by the access point for a certain period of time, and check an SSID contained in the beacon.

Upon detecting the display device 104 as the access point with the SSID=DL1 as a result of the search, the digital video camera 103 starts a connect process with the display device 104 in accordance with the IEEE 802.11 connection sequence in step S412.

Upon completion of the connect process in step S412, the digital video camera 103 starts transmitting image data in step S413. This allows the display device 104 to display the image data recorded in the digital video camera 103.

<5. Processing Result>

Figure 5:
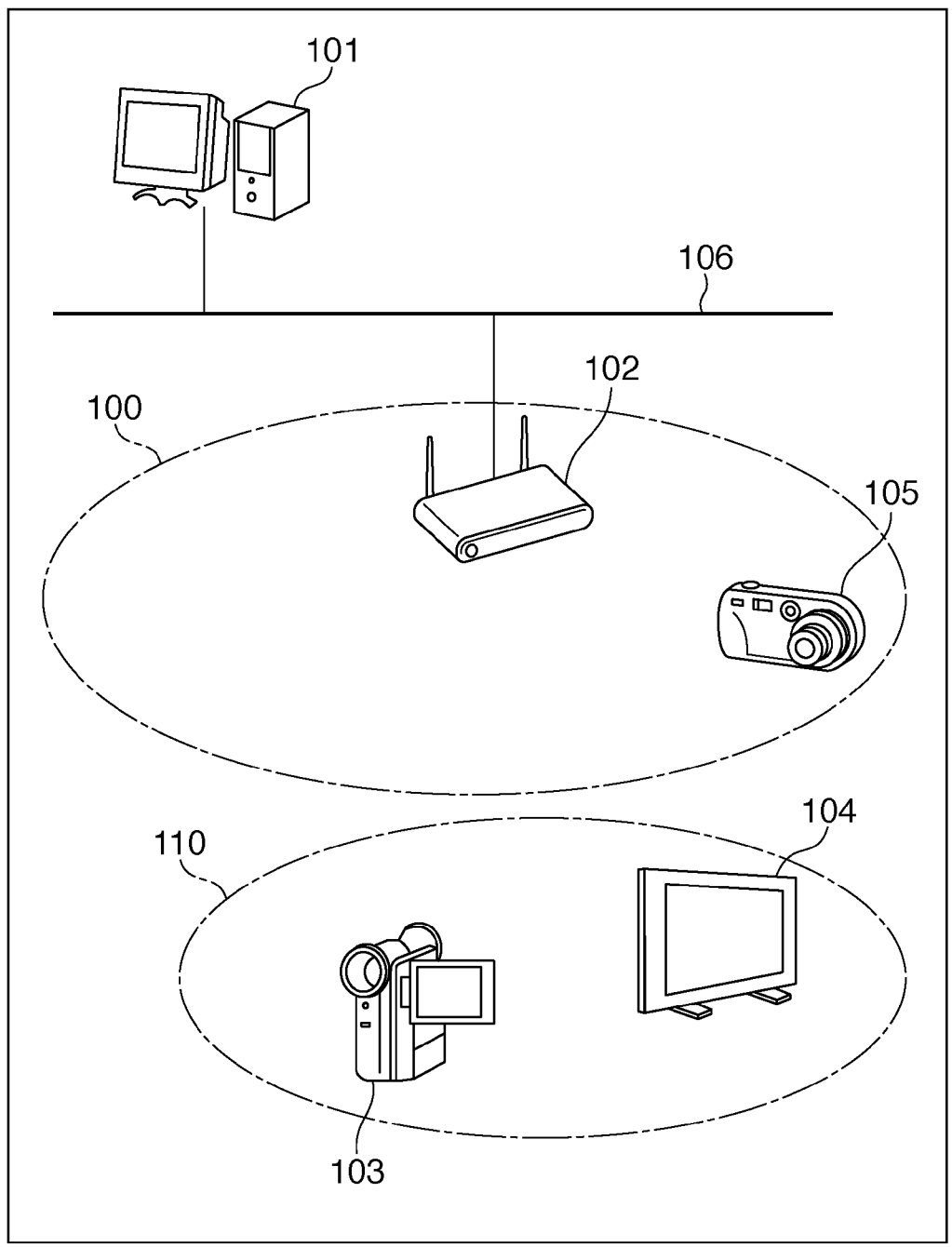
FIG. 5 is a view showing the state of the first wireless communication network 100 and a second wireless communication network 110 after executing processing (FIG. 4) for the first wireless communication network.

FIG. 5 is a view showing a state of the first wireless communication network 100 and a second wireless communication network 110 after executing the above processing (FIG. 4) for the first wireless communication network. As shown in FIG. 5, when the access point function of the display device 104 starts, the second wireless communication network 110 is newly formed between the display device 104 and the digital video camera 103.

When the display device 104 and the digital video camera 103 leave the first wireless communication network 100, only the AP 102 and digital still camera 105 remain in the network 100.

FIG. 6 is a table showing the management table 210 after executing the above processing (FIG. 4) in the first wireless communication network. As shown in FIG. 6, the SSID ("DL1") of the newly formed second wireless communication network 110 is stored in the SSIDs of the display device 104 and digital video camera 103.

The channel ("channel 11") to be used in the newly formed second wireless communication network 110 is stored in the use channels of the display device 104 and digital video camera 103. Information indicating that the display device 104 and digital video camera 103 have formed the second wireless communication network 110 is stored.

Furthermore, the device information of the display device 104 is rewritten from a wireless terminal to an access point.

As is apparent from the above explanation, in this embodiment, when some of the wireless terminals forming the first wireless communication network are to leave the first wireless communication network, the management apparatus is notified of it.

The management apparatus which has been notified determines, based on the management table 210, the SSID of the second wireless communication network to be newly formed.

When the wireless terminals which have left newly form the second wireless communication network, the management apparatus is notified of the network information of the second wireless communication network.

Consequently, the management apparatus can manage the access point and wireless terminal in the newly formed second wireless communication network using the management table 210. It is therefore possible to maintain the communication quality of the first and second wireless communication networks as a whole.

Note that although the display device having the access point function notifies the management apparatus 101 of the network information via the AP 102 in this embodiment, the present invention is not limited to this. For example, each wireless terminal (in this embodiment, the display device 104 or the digital video camera 103) which leaves the network may notify the management apparatus 101 of the network information via the AP 102.

Second Embodiment

In the above first embodiment, when the display device starts the access point function, and newly forms a second wireless communication network, the display device itself notifies the management apparatus of the network information of the second wireless communication network.

In this case, however, if failures and the like occur in the display device 104 after it leaves, the management apparatus cannot keep track of the state after the device leaves.

In this embodiment, therefore, in addition to acquiring network information from a wireless terminal when the wireless terminal leaves the first wireless communication network, a management apparatus itself periodically acquires the network information via an AP 102 even after the wireless terminal leaves the network. The details of this embodiment will be explained below.

The configuration of the first wireless communication network in this embodiment is the same as that in the above first embodiment (FIG. 1), and a description thereof will be omitted. Also, the functional configuration of a management apparatus 101 and a management table 210 managed by the management apparatus 101 are the same as those in FIGS. 2 and 3, and a description thereof will be omitted.

Figure 7:
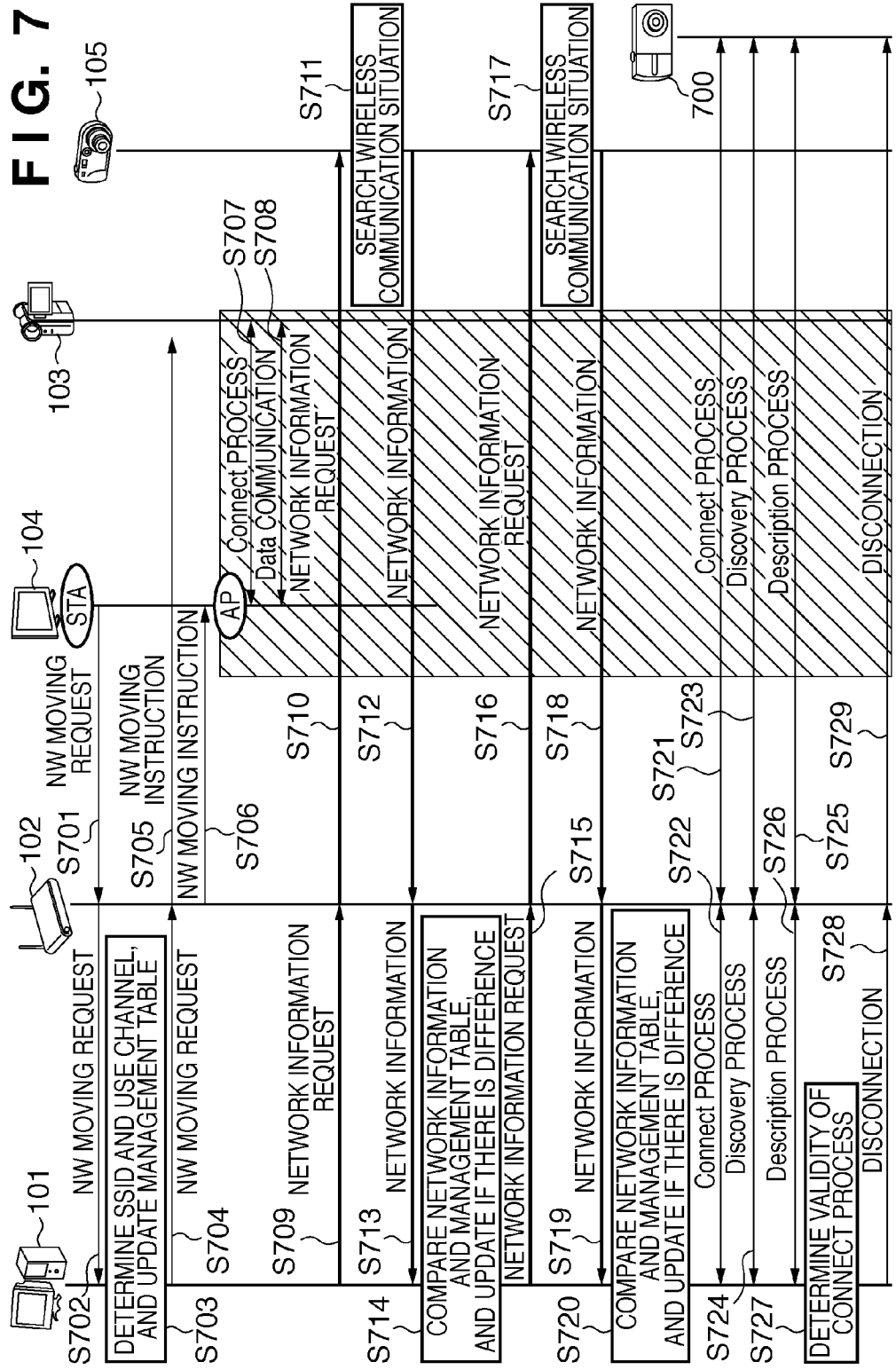
FIG. 7 is a sequence chart showing a processing sequence when a display device 104 and a digital video camera 103, among wireless terminals forming a first wireless communication network 100, leave the first wireless communication network 100.

FIG. 7 is a sequence chart showing a processing sequence in this embodiment when a display device 104 and a digital video camera 103, among wireless terminals forming a first wireless communication network 100, leave the first wireless communication network 100.

As in the above first embodiment, the display device 104 operating as a wireless terminal becomes an access point, and starts processing for newly forming a second wireless communication network 110 in which the digital video camera 103 serves as a wireless terminal.

More specifically, the display device 104 transmits an inter-network moving request to the AP 102 in step S701. Note that the device 104 transmits the inter-network moving request containing information (e.g., an MAC address) on the digital video camera 103 as a communication partner and that on a frequency band desirable for use in the second wireless communication network.

In step S702, the AP 102 which has received the inter-network moving request from the display device 104 transfers it to the management apparatus 101.

In step S703, the management apparatus 101 which has received the inter-network moving request determines the SSID of the second wireless communication network 110 on the basis of the management table (FIG. 3) stored in a storage unit 205. The apparatus 101 also determines a channel to be used in the second wireless communication network 110 to which the display device 104 and the digital video camera 103 have moved.

The SSID is determined so that it is different from the SSID, which is managed in the management table (FIG. 3), and already used by the first wireless communication network 100. The channel to be used is determined so that it is different from the channel, which is managed in the management table (FIG. 3), and already used by the first wireless communication network 100.

In this embodiment, assume that "DL1" is determined as the new SSID and "channel 11" is determined as the new use channel. Assume also that in the management table (FIG. 3), the device information of the display device 104 managed as a wireless terminal is rewritten to indicate an access point.

In step S704, the management apparatus 101 transmits an inter-network moving instruction containing the determined SSID and use channel to the AP 102.

In step S705, the AP 102 which has received the inter-network moving instruction transmits it to the digital video camera 103. In step S706, the AP 102 also transmits the instruction to the display device 104.

The display device 104 which has received the inter-network moving instruction stops the wireless terminal function, and starts operation as an access point. More particularly, the device 104 transmits a beacon containing the SSID=DL1 by the use channel=11.

On the other hand, in step S707, the digital video camera 103 which has received the inter-network moving instruction in step S705 searches for an access point with the SSID ("DL1") contained in the inter-network moving instruction.

Upon detecting the display device 104 as the access point with the SSID=DL1 as a result of the search, the digital video camera 103 starts a connect process with the display device 104 in accordance with the IEEE 802.11 connection sequence.

Upon completion of the connect process in step S707, the digital video camera 103 starts transmitting image data in step S708. This allows the display device 104 to display the image data recorded in the digital video camera 103.

On the other hand, in step S709, the management apparatus 101 which has transmitted the inter-network moving instruction to the AP 102 in step S704 transmits a network information request to the AP 102.

In step S710, the AP 102 which has received the network information request broadcasts it to the first wireless communication network 100.

At this time, only the digital still camera 105 is connected to the first wireless communication network 100. The digital still camera 105 which has received the network information request probes the wireless communication situation around itself in step S711 in response to the request. In step S712, the camera 105 transmits the probing result as network information to the AP 102. More specifically, the camera 105 transmits a probe request, and then transmits as network information the MAC address, the SSID, the use channel and the like of the AP contained in a probe response as a response to the request. The camera 105 may monitor a beacon for a certain period of time, and transmit, as network information, various kinds of information contained in the beacon.

In step S713, the AP 102 which has received the network information from the digital still camera 105 transmits it to the management apparatus 101.

In step S714, the management apparatus 101 which has received the network information from the AP 102 compares the management table 210 and the received network information. If there is a difference as a result of the comparison, the management apparatus 101 updates the management table 210 in accordance with the received network information; otherwise, the management apparatus 101 does not update the management table 210. Note that in this embodiment, assume that there is no difference between the received network information and the management table 210 at this time.

Assume that after the management apparatus 101 receives the network information in step S713, failures occur in the display device 104 for some reason and the device 104 cannot perform wireless communication.

Assume also that in step S715, the management apparatus 101 transmits a network information request again. In this case, the AP 102 which has received the network information request broadcasts it in step S716, as described above.

The digital still camera 105 which has received the network information request probes the wireless communication situation around itself in step S717, as explained above. In step S718, the camera 105 transmits the probing result as network information to the AP 102.

At this time, since the display device 104 is already in a state in which it cannot perform wireless communication, the probing result from the digital still camera 105 does not contain the information (MAC address, SSID, use channel, and the like) on the display device 104.

In step S720, therefore, the management apparatus 101 which has received as the network information the probing result from the digital still camera 105 in step S719 determines that there is a difference between the management table 210 and the network information.

Accordingly, the management apparatus 101 updates the management table 210 on the basis of the received network information. FIG. 8 is a table showing the updated management table.

As shown in FIG. 8, after the update, the information pertaining to the display device 104 which cannot perform wireless communication is erased.

As described above, in this embodiment, by periodically transmitting a network information request, and updating the management table 210, the management apparatus 101 can manage the wireless communication situation of the wireless terminal which has left the first wireless communication network.

An example of merits obtained by managing, as described above, the wireless communication situation of the wireless terminal after leaving the first wireless communication network will be explained continuously using FIG. 7.

Figure 9:
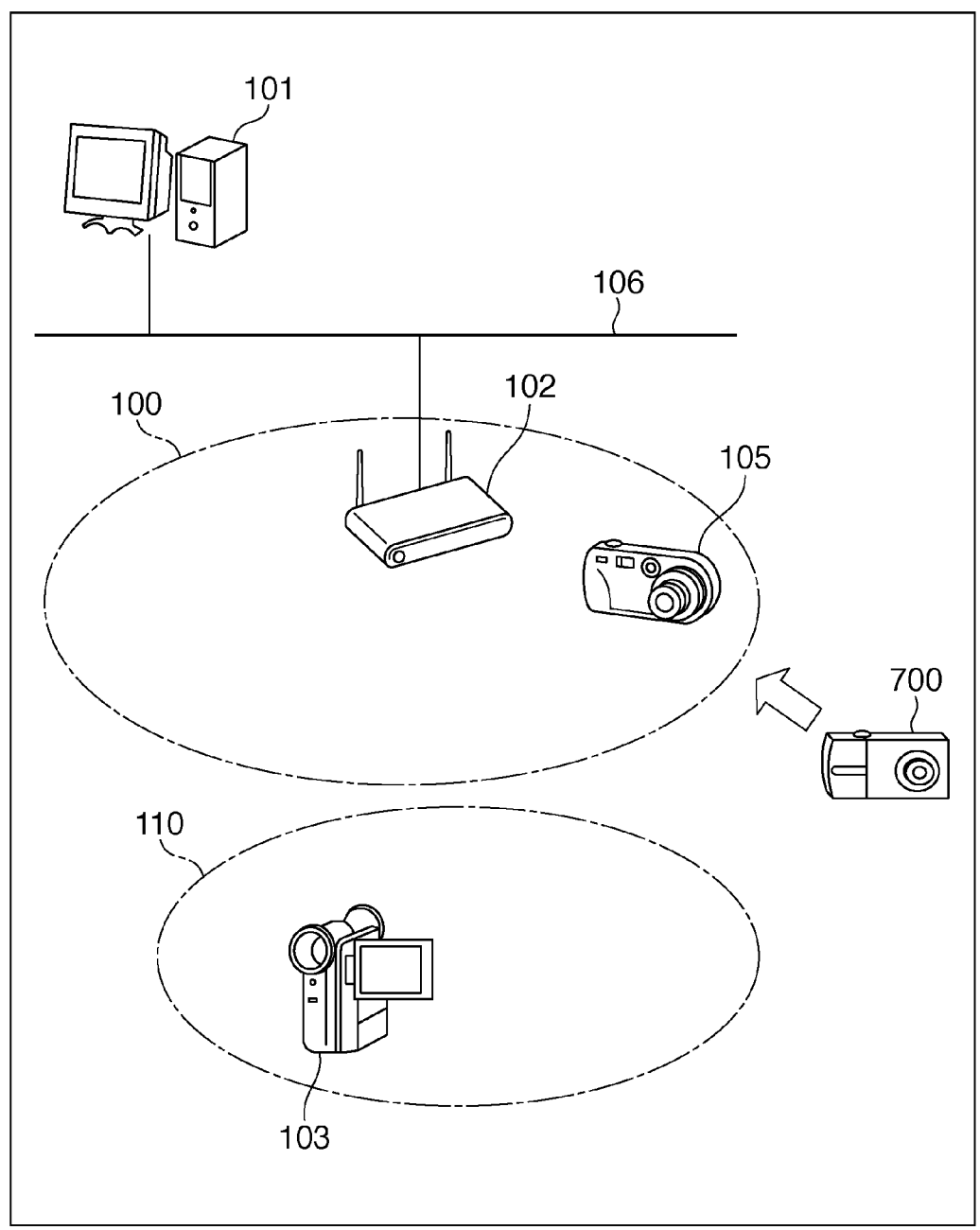
FIG. 9 is a view showing the state of the first wireless communication network 100 and a second wireless communication network 110 after executing processing (FIG. 7) in the first wireless communication network.

Assume that a digital still camera 700 (the third wireless terminal) with an SSID="abcde" newly starts after the management apparatus 101 recognizes that the display device 104 cannot perform wireless communication (see FIG. 9).

In this case, the digital still camera 700 searches for an access point with an SSID="abcde". Upon detecting the AP 102 as an access point with the SSID="abcde", the camera 700 starts a connect process with the AP 102 in accordance with the IEEE802.11 connection sequence in step S721.

In step S722, the AP 102 notifies the management apparatus 101 that the connect process is executed with the digital still camera 700.

The management apparatus 101 which has been notified that the connect process is executed performs the UPnP discovery and description processes with the digital still camera 700 (steps S723, S724, S725, and S726).

As a result of the discovery and description processes, the management apparatus 101 recognizes that the wireless terminal subjected to the connect process is a digital video camera and the service to be provided is an "input" service.

In step S727, the management apparatus 101 determines the validity of the connect process of the digital still camera 700 on the basis of the result of the discovery and description processes. More specifically, the management apparatus 101 determines based on the management table 210 that there is no wireless terminal which can provide an "output" service in the first wireless communication network 100 or the second wireless communication network 110.

That is, the management apparatus 101 determines that even if the digital still camera 700 is newly connected, there is no wireless terminal which can output image data recorded in the digital still camera 700 within the first wireless communication network 100 or the second wireless communication network 110.

The management apparatus 101 then determines that the connection of the digital still camera 700 is not appropriate. In step S728, the apparatus 101 transmits a disconnection instruction to the AP 102.

In step S729, the AP 102 which has received the disconnection instruction transmits it to the digital still camera 700. Consequently, the digital still camera 700 disconnects the connection with the AP 102.

As described above, by managing the wireless communication situation of the wireless terminal after leaving the first wireless communication network, it is possible to avoid unnecessary connection like in the above-explained example. If the management apparatus 101 determines in step S727 that there is no wireless terminal which can provide an "output" service in the first wireless communication network 100, but there is such a wireless terminal in the second wireless communication network 110, the following operation may be performed. That is, a moving instruction to the second wireless communication network may be transmitted to the digital still camera 700. This enables the digital still camera 700 to automatically join the network in which there is a wireless terminal capable of outputting image data.

As is apparent from the above explanation, in this embodiment, the management apparatus periodically acquires the network information via the AP 102.

Consequently, it is possible to keep track of the wireless communication situation of the wireless terminal which has left the first wireless communication network, even after the terminal leaves. This makes it possible to avoid an unnecessary wireless terminal being newly connected.

Note that although not especially mentioned in this embodiment, the network information periodically acquired by the management apparatus may be displayed on a display unit 202.

Third Embodiment

In the above first embodiment, a case in which the display device 104 that has left the first wireless communication network 100 functions as an access point, and wirelessly communicates with the digital video camera using a predetermined use band has been explained.

Depending on the use band, however, it may be impossible to transmit image data from the digital video camera to the display device. In this embodiment, a case in which when a display device that has left a first wireless communication network 100 functions as an access point, the display device appropriately sets, based on a management table 210, a use band used for wireless communication will be described.

Note that the configuration of the first wireless communication network in this embodiment is the same as that in the above first embodiment (FIG. 1), and a description thereof will be omitted. Also, the functional configuration of a management apparatus 101 and a management table managed by the management apparatus 101 are the same as those in FIGS. 2 and 3, and a description thereof will be omitted.

Figure 10:
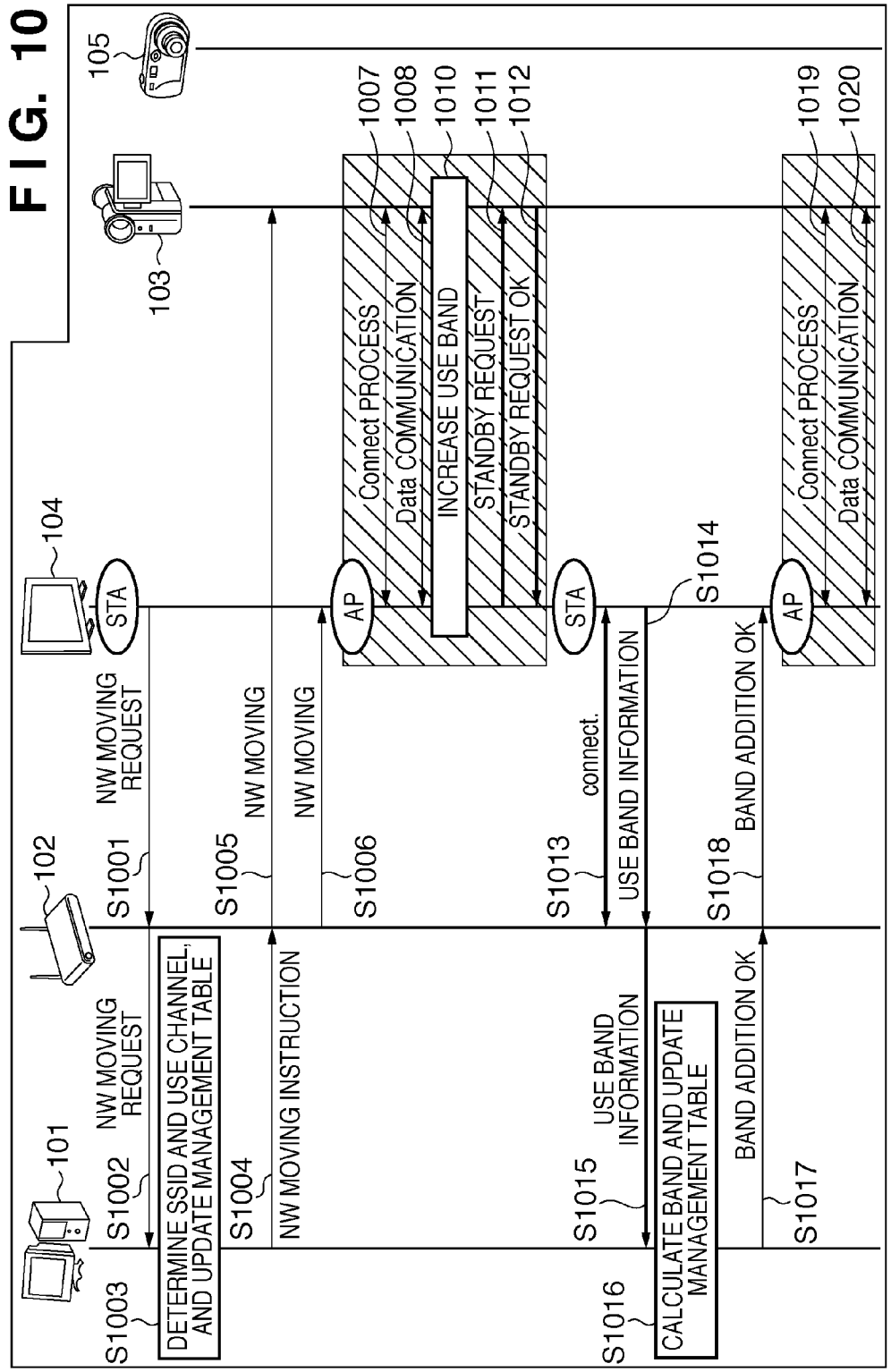
FIG. 10 is a sequence chart showing a processing sequence when a display device 104 and a digital video camera 103, among wireless terminals forming a first wireless communication network 100, leave the first wireless communication network 100.

FIG. 10 is a sequence chart showing a processing sequence when a display device 104 and a digital video camera 103, among wireless terminals forming the first wireless communication network 100, leave the first wireless communication network 100.

As in the above first embodiment, the display device 104 which has been operating as a wireless terminal becomes an access point, and starts processing for forming a new second wireless communication network 110 in which the digital video camera 103 serves as a wireless terminal.

More specifically, in step S1001, the display device 104 transmits an inter-network moving request to an AP 102. Note that the device 104 transmits the inter-network moving request containing information (e.g., an MAC address) on the digital video camera 103 as a communication partner and that on a frequency band desirable for use in the second wireless communication network.

In step S1002, the AP 102 which has received the inter-network moving request from the display device 104 transfers it to the management apparatus 101.

The management apparatus 101 which has received the inter-network moving request determines, based on the management table (FIG. 3) stored in a storage unit 205, the SSID of the second wireless communication network 110 to which the display device 104 and the digital video camera 103 move. The apparatus 101 also determines a channel to be used in the second wireless communication network 110 to which the display device 104 and the digital video camera 103 have moved.

The SSID is determined so that it is different from the SSID, which is managed in the management table (FIG. 3), and already used by the first wireless communication network 100. The channel to be used is determined so that it is different from the channel, which is managed in the management table (FIG. 3), and already used by the first wireless communication network 100.

In this embodiment, assume that "DL1" is determined as the new SSID and "channel 11" is determined as the new use channel. Assume also that in the management table (FIG. 3), the device information of the display device 104 managed as a wireless terminal is rewritten to indicate an access point.

In step S1004, the management apparatus 101 transmits, to the AP 102, an inter-network moving instruction containing the determined SSID and use channel.

In step S1005, the AP 102 which has received the inter-network moving instruction transmits it to the digital video camera 103. In step S1006, the AP 102 also transmits the instruction to the display device 104.

The display device 104 which has received the inter-network moving instruction stops the wireless terminal function, and starts operation as an access point. More specifically, the device 104 transmits a beacon containing the SSID=DL1 by the use channel 11.

On the other hand, in step S1007, the digital video camera 103 which has received the inter-network moving instruction in step S1005 searches for an access point with the SSID ("DL1") contained in the inter-network moving instruction.

Upon detecting the display device 104 as an access point with the SSID=DL1 as a result of the search, the digital video camera 103 starts a connect process with the display device 104 in accordance with the IEEE 802.11 connection sequence. With this operation, the second wireless communication network 110 is formed. Assume that at this time, the display device 104 stores the network information of the first wireless communication network 100.

Upon completion of the connect process in step S1007, the digital video camera 103 starts transmitting image data in step S1008. This allows the display device 104 to display the image data recorded in the digital video camera 103.

Assume that the digital video camera 103 sends a transmission request of moving image data to the display device 104, and the display device 104 determines that it cannot transmit moving image data with a band currently used.

In this case, the display device 104 determines that it is necessary to increase the band used. In step S1011, the device 104 then transmits a standby request instruction containing a standby time to the digital video camera 103. The standby request instruction is an instruction for requesting to maintain the connection with the current wireless communication network (the second wireless communication network 110) without reconnecting to the first wireless communication network 100 until the notified standby time elapses.

The digital video camera 103 which has received the standby request instruction recognizes it, and transmits a standby request OK message to the display device 104 in step S1012.

The display device 104 which has received the standby request OK message switches its operation from the access point function to the wireless terminal function in order to temporarily connect to the first wireless communication network 100 formed by the AP 102. In step S1013, the display device 104 then performs a connect process using the stored network information of the AP 102. Note that in temporarily connecting to the first wireless communication network 100, the display device 104 stores the network information of the second wireless communication network 110.

Upon completion of the connect process with the AP 102, the display device 104 transmits use band information to the AP 102 in step S1014. The display device 104 may transmit, to the AP 102, information on a band desirable to add (a communication band addition request).

In step S1015, the AP 102 which has received the use band information transmits it to the management apparatus 101.

In step S1016, the management apparatus 101 which has received the use band information from the AP 102 calculates, based on the received use band information, an addable band enough for the digital video camera 103 to transmit moving image data to the display device 104. In calculating the use band, the management apparatus 101 determines whether the first wireless communication network 100 is affected when using the calculated band in the second wireless communication network 110.

When calculating the addable use band within a range which does not affect the first wireless communication network 100, the management apparatus 101 updates, with the calculated use band, the use bands of the digital video camera 103 and display device 104 in the management table 210.

FIG. 11 is a table showing an example of the management table after the use band information is updated. In the example of FIG. 11, the use bands of the digital video camera 103 and display device 104 are updated with "15".

When the update of the use bands of the management table 210 is completed, the management apparatus 101 transmits a band addition OK message containing information on the calculated use band to the AP 102 in step S1017. In step S1018, the AP 102 which has received the band addition OK message transmits it to the display device 104.

The display device 104 which has received the band addition OK message refers to the stored network information of the second wireless communication network 110, starts the access point function, and restarts the operation as an access point.

On the other hand, in step S1011, the digital video camera 103 which has received the standby request instruction periodically searches for an access point with the SSID=DL1.

As described above, since the display device 104 restarts the operation as an access point after receiving the band addition OK message, the digital video camera 103 detects the display device 104 as an access point with the SSID=DL1.

In step S1019, the digital video camera 103 which has detected the display device 104 as an access point executes a connect process with the display device 104 in accordance with the IEEE 802.11 connection sequence.

Upon completion of the connect process in step S1019, the digital video camera 103 starts transmitting moving image data using the calculated use band in step S1020. This allows the display device 104 to display the moving image data recorded in the digital video camera 103.

As is apparent from the above explanation, in this embodiment, when it is necessary to increase the use band in the new second wireless communication network formed by a wireless terminal which has left the first wireless communication network, the wireless terminal reconnects to the first wireless communication network. The management apparatus is notified that it is necessary to increase the use band.

Furthermore, the management apparatus manages the wireless terminal after leaving. Upon receiving, from the wireless terminal, information indicating that it is necessary to increase the use band, the management apparatus calculates, based on the management table, the use band within a range which does not affect the first wireless communication network to which the wireless terminal was connected before leaving.

Consequently, the newly formed second wireless communication network makes it possible to increase the use band of the newly formed second wireless communication network without affecting the first wireless communication network to which the wireless terminal was originally connected.

Other Embodiments

The present invention may be applied to a system including a plurality of devices (e.g., a host computer, interface device, reader, and printer) or an apparatus (e.g., a copying machine, or facsimile apparatus) formed by a single device.

The object of the present invention is also achieved when a computer-readable storage medium which records software program codes for implementing the functions of the above-described embodiments is supplied to a system or apparatus. The above functions are implemented when the computer (or the CPU or MPU) of the system or apparatus reads out and executes the program codes stored in the storage medium. In this case, the storage medium which stores the program codes constitutes the present invention.

The storage medium for supplying the program codes includes a Floppy® disk, hard disk, optical disk, magnetooptical disk, CD-ROM, CD-R, magnetic tape, nonvolatile memory card, and ROM.

The present invention is not limited to a case in which the functions of the above-described embodiments are implemented when the computer executes the readout program codes. Also, the present invention includes a case in which the functions of the above-described embodiments are implemented when an OS (Operating System) or the like running on the computer performs some or all of actual processes on the basis of the instructions of the program codes.

Furthermore, the present invention includes a case in which, after the program codes read out from the storage medium are written in the memory of a function expansion board inserted into the computer or the memory of a function expansion unit connected to the computer, the functions of the above-described embodiments are implemented. That is, the present invention includes a case in which, after the program codes are written in the memory, the CPU of the function expansion board or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-045106, filed on Feb. 26, 2008, which is hereby incorporated by reference herein in its entirety.

The invention claimed is:

1. A communication apparatus, comprising:
a storage unit configured to store, in correspondence with each other, (a) apparatus information regarding a wireless apparatus which belongs to a wireless communication network and (b) identification information of the wireless communication network to which the wireless apparatus belongs;
a determination unit configured to determine, in a case that a wireless apparatus of a first wireless communication network requests moving out of a network, new identification information of a second wireless communication network to be newly formed by the wireless apparatus as a wireless communication network of a moving destination;
a sending unit configured to send the identification information of the second wireless communication network determined by the determination unit to the wireless apparatus, so that the wireless apparatus can communicate in the second wireless communication network.

2. The communication apparatus according to claim 1, wherein the sending unit sends the identification information of the second wireless communication network determined by the determination unit to the wireless apparatus which moves to the second wireless communication network via a base station which forms the first wireless communication network.

3. The communication apparatus according to claim 1, wherein the wireless apparatus is switchable between (a) a function for operating as a wireless apparatus to communicate with a base station and (b) a function for operating as a base station, and
wherein the sending unit sends the identification information of a base station which forms the first wireless communication network so that the wireless apparatus which requests moving out of a network forms the second wireless communication network as a base station, corresponding to the identification information of the second wireless communication network determined by the determination unit.

4. The communication apparatus according to claim 1, further comprising an update unit configured to update information regarding the wireless apparatus which formed the second wireless communication network as a base station.

5. The communication apparatus according to claim 4, wherein the update unit further updates channel information of the second wireless communication network.

6. The communication apparatus according to claim 4, further comprising a request unit configured to periodically request search of identification information of the second wireless communication network for wireless apparatuses which belong to the first wireless communication network after the second wireless communication network is formed,
wherein the update unit updates information regarding the wireless apparatus stored by the storage unit based on a response to the request.

7. The communication apparatus according to claim 6, further comprising an acquiring unit configured to acquire attribute information of a wireless apparatus which newly belongs to the first wireless communication network; and
a decision unit configured to decide, based on the acquired attribute information of the wireless apparatus which newly belongs to the first wireless communication network and attribute information of another wireless apparatus stored by the storage unit, whether or not the wireless apparatus which newly belongs to the first wireless communication network is to be maintained as belonging to the first wireless communication network.

8. The communication apparatus according to claim 7, wherein the decision unit transmits, to the wireless apparatus which newly belongs to the first wireless communication network, a disconnection instruction if the decision unit decides that the wireless apparatus which newly belongs to the first wireless communication network is not to be maintained as belonging to the first wireless communication network.

9. The communication apparatus according to claim 7, wherein the decision unit transmits, to the wireless apparatus which newly belongs to the first wireless communication network, a moving instruction to the second wireless communication network in a case that the decision unit decides that the wireless apparatus which newly belongs to the first wireless communication network is not to be maintained as belonging to the first wireless communication network.

10. The communication apparatus according to claim 1, wherein the identification information of the second wireless communication network determined by the determination unit is sent to (a) the wireless apparatus which requests moving out of a network and (b) a wireless apparatus which is designated by the wireless apparatus which requests moving out of a network.

11. The communication apparatus according to claim 1, wherein the storage unit further stores communication band information used by each wireless apparatus, and
wherein the determination unit determines, based on the communication band information stored by the storage unit, whether or not the communication band is able to be added in a case that the determination unit receives a request for adding the communication band from the wireless apparatus which formed the second wireless communication network, after the second wireless communication network is formed.

12. The communication apparatus according to claim 1, further comprising an update unit configured to update network information, corresponding to the apparatus information, stored by the storage unit, regarding the wireless apparatus which moves to the second wireless communication network, based on the identification information of the second wireless communication network determined by the determination unit.

13. A control method executed by a communication apparatus which stores in a storage, in correspondence with each other, (a) apparatus information regarding a wireless apparatus which belongs to a wireless communication network, and (b) identification information of the wireless communication network to which the wireless apparatus belongs, the method comprising the steps of:
determining, in a case that a wireless apparatus of a first wireless communication network requests moving out of a network, new identification information of a second wireless communication network to be newly formed by the wireless apparatus as a wireless communication network of a moving destination; and
sending the identification information of the second wireless communication network determined in the determining step to the wireless apparatus, so that the wireless apparatus can communicate in the second wireless communication network.

14. A non-transitory computer-readable recording medium which, when executed by a computer of a communication apparatus, which stores, in correspondence with each other, (a) information regarding a wireless apparatus which belongs to a wireless communication network and (b) identification information of the wireless communication network to which the wireless apparatus belongs, performs a method comprising the steps of:
determining, in a case that a wireless apparatus of a first wireless communication network requests moving out of a network, new identification information of a second wireless communication network to be newly formed by the wireless apparatus as a wireless communication network of a moving destination; and
sending the identification information of the second wireless communication network determined in the determining step to the wireless apparatus, so that the wireless apparatus can communicate in the second wireless communication network.

15. An information processing apparatus, comprising:
a receiving unit configured to receive, from a second wireless communication apparatus which belongs to a first wireless network formed by a first wireless communication apparatus, a move request to move to a second wireless network which is newly formed by the second wireless communication apparatus as a wireless communication network of a moving destination; and
an acquiring unit configured to acquire frequency channel information sent from the second wireless communication apparatus in the case that the second wireless communication apparatus moves to the second wireless network.

16. The information processing apparatus according to claim 15, further comprising an instruction unit configured to instruct the second wireless communication apparatus to move to the second wireless network,
wherein the acquiring unit acquires network information of the second wireless network from the second wireless communication apparatus in the case that the second wireless communication apparatus moves to the second wireless network in correspondence with the instruction by the instruction unit.

17. The information processing apparatus according to claim 15, wherein the receiving unit receives the move request via the first wireless communication apparatus, and the acquiring unit acquires the frequency channel information via the first wireless communication apparatus.

18. The information processing apparatus according to claim 15, wherein the frequency channel information is information of a frequency channel which is used in the second wireless network.

19. The information processing apparatus according to claim 15, wherein the acquiring unit acquires identification information of the second wireless communication network.

20. The information processing apparatus according to claim 15, wherein the move request includes information of a third wireless communication apparatus which moves from the first wireless network to the second wireless network, wherein the third wireless communication network is different from the second wireless communication apparatus.

21. The information processing apparatus according to claim 15, wherein the information processing apparatus and the first wireless communication apparatus are separate from each other.

22. The information processing apparatus according to claim 21, wherein the information processing apparatus is connected to the first wireless communication apparatus by wire.

23. An information processing method, comprising:
receiving, from a second wireless communication apparatus which belongs to a first wireless network formed by a first wireless communication apparatus, a move request to move to a second wireless network which is newly formed by the second wireless communication apparatus as a wireless communication network of a moving destination; and
acquiring frequency channel information sent from the second wireless communication apparatus in the case that the second wireless communication apparatus moves to the second wireless network.

24. A non-transitory computer-readable recording medium which, when executed by a computer of an information processing apparatus, performs the steps of:
receiving, from a second wireless communication apparatus which belongs to a first wireless network formed by a first wireless communication apparatus, a move request to move to a second wireless network which is newly formed by the second wireless communication apparatus as a wireless communication network of a moving destination; and
acquiring frequency channel information sent from the second wireless communication apparatus in the case that the second wireless communication apparatus moves to the second wireless network.

* * * * *